July 13, 1948.  J. EVANS  2,445,213
OBSTACLE DETECTOR
Filed April 30, 1941  4 Sheets-Sheet 1

Inventor
John Evans
Attorney

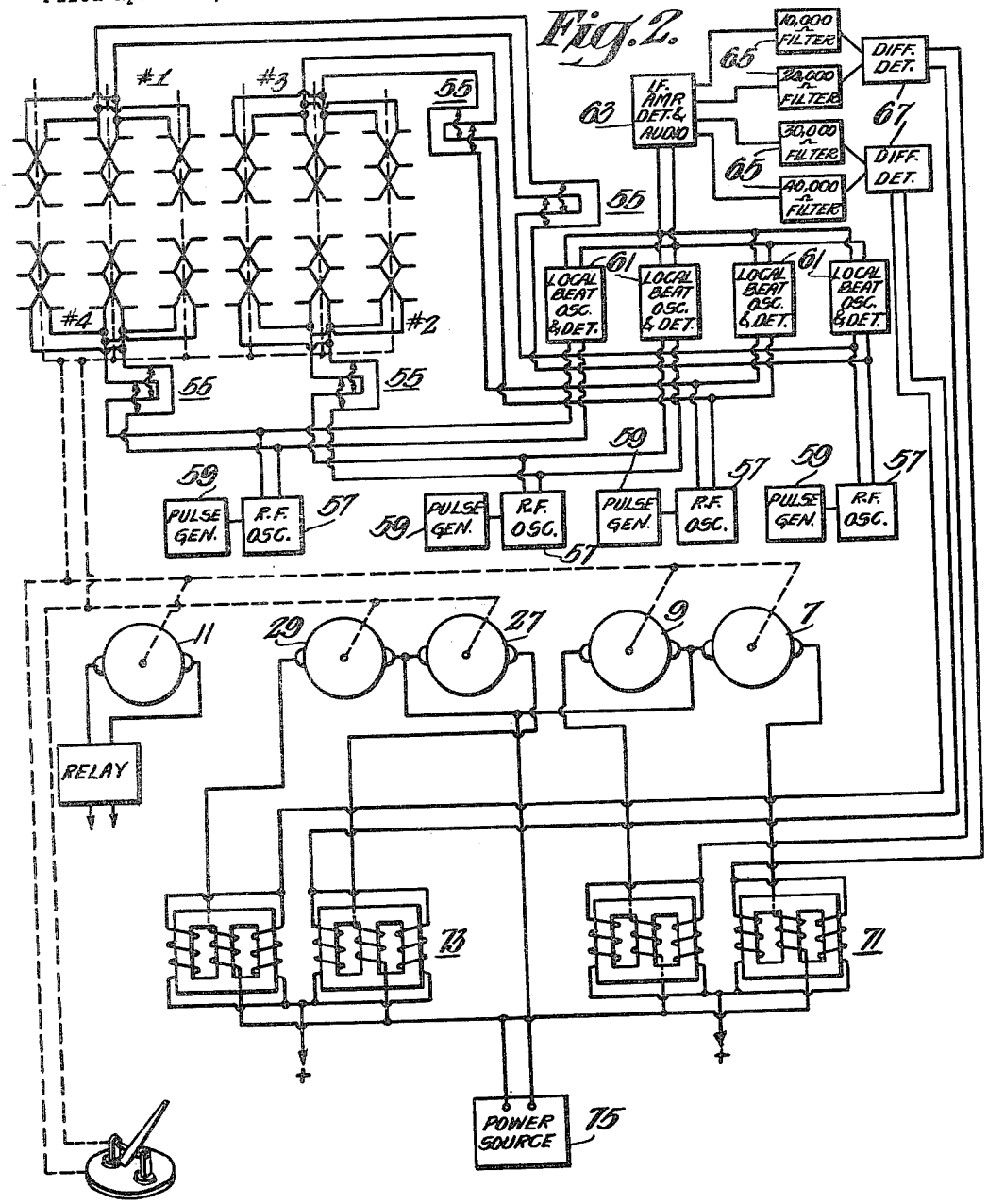

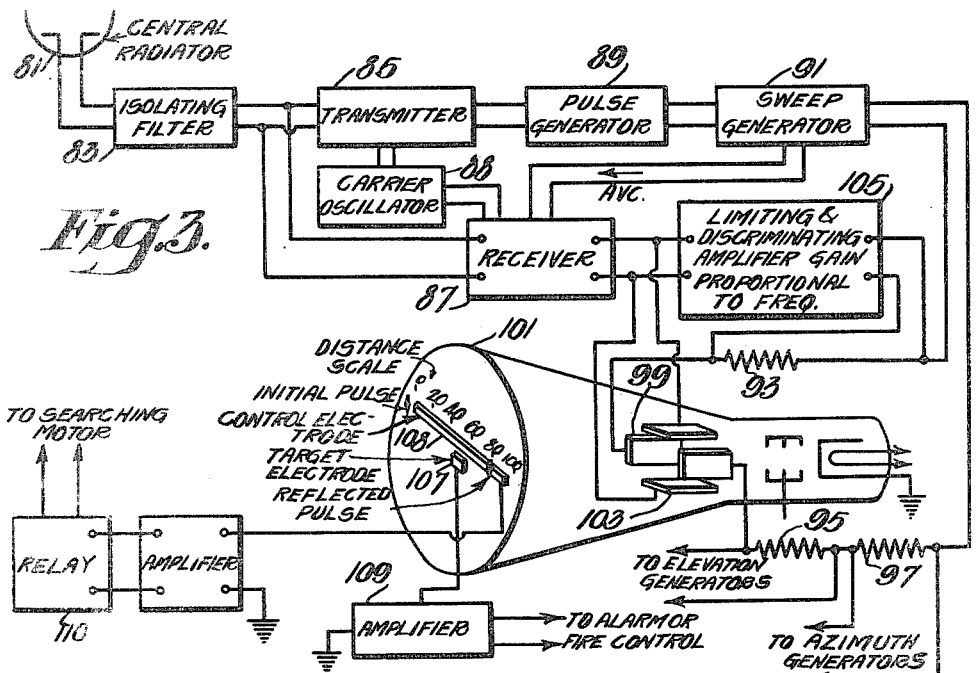
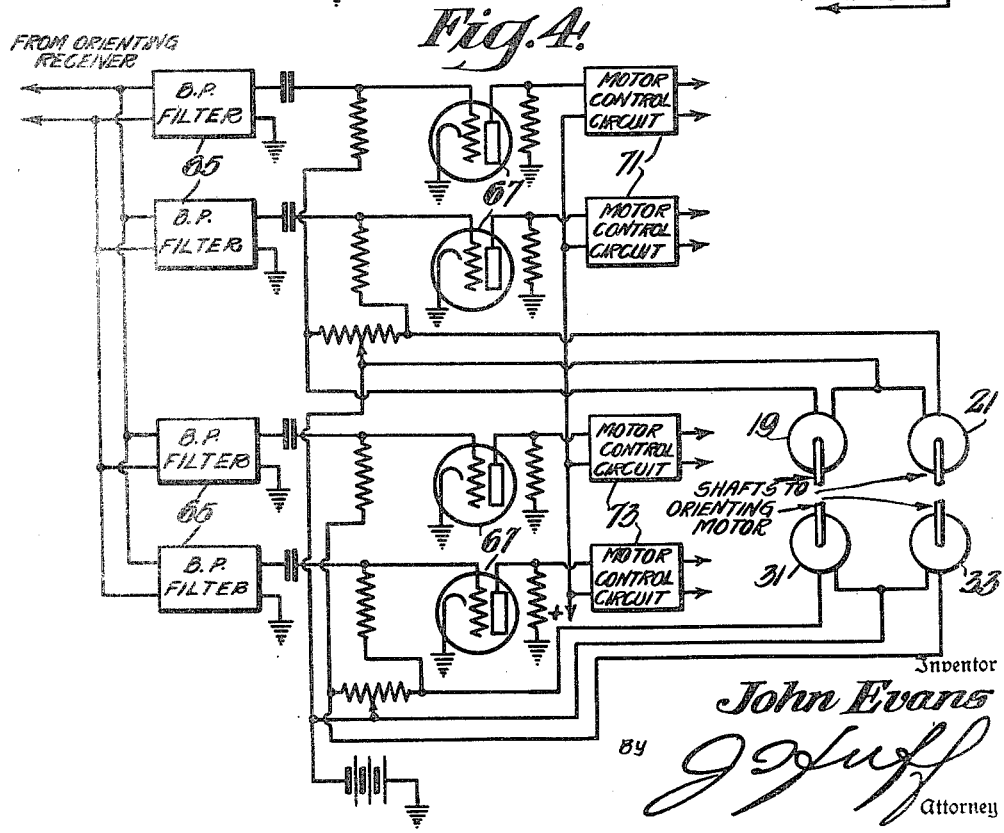

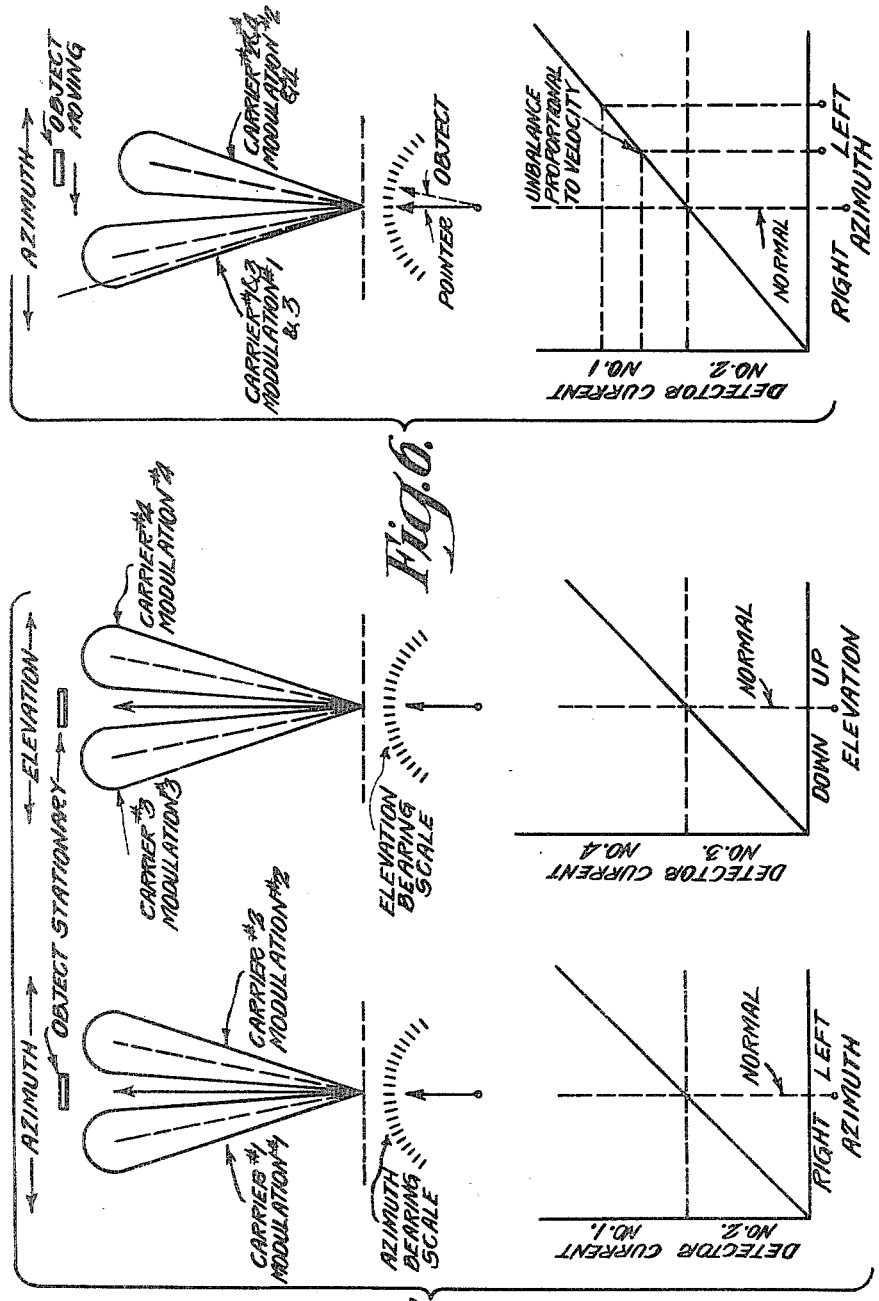

Patented July 13, 1948

2,445,213

UNITED STATES PATENT OFFICE 2,445,213

OBSTACLE DETECTOR

John Evans, Palmyra, N. J., assignor to Radio Corporation of America, a corporation of Delaware Application April 30, 1941, Serial No. 391,167

11 Claims. (Cl. 343—7)

1

This invention relates to improvements in obstacle detectors and particularly to an obstacle detector operated by radio waves and provided with self-orienting mechanism.

It is old to propagate radio waves and to indicate obstacles by observing reflections thereof. When such radio echo systems are provided with directive transmitters or directive receivers, the approximate azimuthal and elevational bearings may be determined by adjusting manually the directive device until a maximum reflection is obtained. While such devices give an approximate indication, the bearings are not indicated with sufficient accuracy or rapidity for directing gun fire or for imparting navigational information. Furthermore, the prior art devices are not entirely suitable for self-orientation.

It is one of the objects of the present invention to provide means for indicating accurately the azimuthal and elevational bearings of an object by means of radio waves. Another object is to provide means for orienting automatically a radio echo device to indicate the position of the object and to follow movements of the object. Another object is to provide means for directing radio echo apparatus to locate and to follow automatically a moving object and to anticipate the position of the moving object as a function of its instantaneous rate of change of position. An additional object is to provide means for directing gun fire by means of a self-orienting radio echo device provided with automatic gun fire control mechanism.

The invention will be described by referring to the accompanying drawings in which Fig. 1 is a schematic illustration of the orienting mechanism of the invention; Figure 2 is a schematic circuit diagram of the radio echo apparatus of the invention and the orienting mechanism; Figure 3 is a schematic diagram of the distance indicator and gun fire control mechanism; Figure 4 is a schematic circuit diagram of the differential detectors; and Figures 5 and 6 are graphs used in describing the invention.

Referring to Fig. 1, a rotatable hollow shaft 1 is suitably mounted on a base 3. The shaft is coupled through a gear box 5 to a left orienting motor 7 and a right orienting motor 9. A searching motor 11 is connected to the shaft 1 by means of gears 13. The left and right orienting motors 7 and 9 are connected through gear boxes 15 and 17, respectively, to generators 19 and 21, respectively. The purpose of the generators will be described hereinafter.

A turntable 23 is mounted on the shaft 1 so

2 that the turntable is rotated by means of the searching motor or the left-right orienting motors. An elevation control gear box 25, an elevation increasing motor 27, and an elevation decreasing motor 29 are mounted on the turntable. Generators 31 and 33, respectively, are coupled through gear boxes 35 and 37, respectively, to the elevation motors 27 and 29, respectively. The purpose of the generators will be hereinafter explained.

Four directive radiators 39 (only one is shown to avoid confusion) which may be directive arrays, reflectors, or horns including antennas, are mounted on the output shaft 41 of the elevation control gear box. The four radiators are arranged so that their fields extend in four sharply defined lobes which are symmetrically arranged above and below and to the right and left of a center line about which the radiators are arranged. The two elevational motors raise and lower the radiators which are thus oriented so that their center line extends from the horizon to the zenith. The arm 43 carrying the radiators operates switches 45, 47 so that the motors automatically and continuously increase and decrease the angle of elevation of the center line from 0° to 90° or through any desired sweep. The turntable is rotated so that the directive pattern of the array may be extended through all azimuth angles. If the elevational sweep is at a considerably different rate from the azimuth sweep, the device will scan a hemisphere.

The four radiators are preferably connected through four concentric transmission lines which may be positioned within the shaft. Instead of using slip rings and brushes, it is preferable to use capacitor commutators in which the inner member of each line is connected to a rotor plate or disc or ring 49. The rotor is placed near a stator 51 so that energy from or to the antennas may be readily transferred from or to the fixed lines 53.

Referring to Fig. 2, the four transmission lines from the antennas, called antennas No. 1, No. 2, No. 3 and No. 4 for convenience, are respectively connected through phasing networks 55 to four oscillators or transmitters 57. Each of the transmitters is distinctively pulsed at a different rate preferably even multiples so that all pulses start at the same instant by means of pulse generators 59. The four antennas are also connected to four receivers 61 which include local oscillators and detectors. The outputs from the four receivers are applied to a common intermediate frequency amplifier, detector, and audio amplifier 63. The output of the common amplifier 63 is applied to four filters 65 which respectively select the components of the received reflected radio waves corresponding to the pulse frequency of the transmitters; for example, 10,000, 20,000, 30,000 and 40,000 cycles per second. The filtered components are applied in pairs to differential detectors 67. The outputs of the differential detectors are used to control the orienting motors 7, 9 and 27, 29 shown in Fig. 1. It should be noted that the directional radiators are connected diagonally in pairs to the differential detectors so that the outputs from each differential detector depends upon the ratio of the strengths of the signals received by the diagonally connected radiators.

The motor control circuits are shown in the lower part of Fig. 2. The currents from the differential detectors are applied respectively to pairs of variable reactors 71 and 73. The reactors of one pair of variable reactors 71 are connected respectively to the left and right orienting motors 7 and 9. The reactors of the other pair 73 are connected respectively to the motors 27 and 29 for increasing and decreasing the angle of elevation. The currents from the differential detectors control the power applied from the power source 75 to the several orienting motors.

The mode of operation is as follows: Pulses of radio frequency energy are directively radiated from the four directive antennas so that four cones or separately directed juxtaposed beams of radiation are established as shown in Fig. 5. If the cones represent signals of equal strength and if the cones of radiation be moved through the azimuth and through various angles of elevation, the entire region about the device will be scanned. If the radiation reaches a wave reflecting object, the reflected waves will include the pulse components of the four initial frequencies in relative amounts dependent upon the position of the wave reflecting object with respect to the four cones of radiation.

If the object lies on the center line of the four cones, equal reflections will be received and therefore the outputs of the differential detectors will be equal and the four orienting motors will be stationary. If the object was aligned with the axis of the upper right hand cone, then the differential detector outputs would be unbalanced; the right orienting motor would drive the array to the right; and the motor increasing elevation would drive the array to increase its angle of elevation. When the object is on the center line, the reflected signals would again be equal and the array would become stationary. The azimuth angle and the angle of elevation could then be readily indicated by means of suitable scales attached to the turntable and elevating mechanism. Thus the foregoing arrangement may be used to orient itself on a wave reflecting object such as an airplane.

In the event that the distance of the reflecting object, as well as its bearing, is to be indicated a fifth cone of radiation may be included so that its axis falls along the center line of the array. The distance and rate of change determining system may be of the type illustrated in Fig. 3. The receiver includes a cathode ray indicator which is connected to a sweep generator so that the ray is moved along a timing or distance coordinate. The reflected pulses are applied to deflect the ray along a second coordinate in the manner well known to those skilled in the art. The cathode ray tube includes a target electrode 107 which is set at a predetermined distance. When the ray is deflected on the target electrode, it will operate an alarm signal or may be used to control gun fire as hereinafter described.

In the event that the device is used to control gun fire, directed toward a moving object, it is preferable to assume that the range will be fixed so that high explosive shells may be timed to explode at the selected range. Furthermore, the cathode ray tube target electrode is adjusted to correspond to the selected range. In order that the gun be properly pointed, it is necessary to "anticipate" the position of the moving object. Such anticipation is based upon the object continuing to move in the direction and at the rate of movement observed just prior to its reaching the selected point at which the explosion of the shell is set. The anticipation should correspond to the angular rate of movement of the object and to the component of motion directed toward the gun and radio control therefor.

The angular anticipation is accomplished by deriving from the orienting mechanism, a pair of forces corresponding to the angular rate of movement in the azimuth and in the elevation. One suitable means has been shown in Fig. 1 in which the several generators 19, etc. are driven by the orienting motors. The generated voltages or currents will be proportional to the angular rate of change of the arrays. The generated voltages may be used in either or both of the following manners: First, the voltages may be applied to the differential detectors 67 to unbalance one or both pairs. This may be accomplished by biasing the detectors as shown in Fig. 4, which illustrates a preferred embodiment. Second, the voltages may be applied to make the pulse amplitude or radiated power greater on one or both of the pairs of diagonally related cones of radiation. This may be accomplished by biasing one or more vacuum tubes in the pulse generator or in the transmitter. The voltages may be obtained from a potentiometer operated by a governor, controlled by the orienting motors instead of generators driven by the motors. The effect of making one of the cones of radiation or the pulses therein stronger is shown in Fig. 6. The moving object is now shown as slightly behind the center line of the radiation. The amount of lag is determined by the angular velocity of the object and hence the pointer anticipates the position of the object.

The circuits for applying the angular and distance anticipation to the range indicator are shown in Fig. 3. A central radiator 81 is connected through an isolating filter 83 to a transmitter 85 and a receiver 87, which include a carrier oscillator 88. The transmitter is connected to a pulse generator 89 which is in turn connected to a sweep generator 91. The sweep generator applies sweep potentials, through resistors 93, 95, 97 to the horizontal deflecting electrodes 99 of a cathode ray tube 101. Two of the resistors 95 and 97 are connected to one of the elevation generators and one of the azimuth generators of Fig. 1.

The output of the receiver 87 is connected to the vertical deflecting electrodes 103 and to a limiting and discriminating amplifier 105. The output of the discriminating amplifier, which has a gain proportional to frequency, is connected to the resistor 93 in the horizontal sweep circuit. The target electrode 107 is arranged so that the reflected signal pulses will be applied at the desired range. The target electrode may be connected through an amplifier 109 to an alarm or to a fire control mechanism or both. The control electrode 108 is connected through an amplifier and a relay 110 to the continuous search motor 11.

The operation of the system, when no anticipation is involved, is that of a conventional pulse echo distance measuring device. The outgoing pulses and the cathode ray horizontal timing sweep are synchronized. If no reflections are received the control electrode circuit will be open and the continuous search motor in operation. The incoming reflected pulses deflect the cathode ray along a coordinate suitably disposed with respect to the timing sweep, and thus the distance of the reflecting object is indicated. At the same time the search motor will be stopped but the orienting motors will be in operation. If the distant object is moving, the array will be in motion as previously described. Any elevational or azimuthal movements will be accompanied by the generation of voltages which are applied in a positive or negative sense to advance or retard the cathode ray sweep as a function of the angular rate of movement of the target. It should be understood that if the anticipatory corrections are to be included, the distance scale may be expanded so that the distance indications are limited to the regions immediately surrounding the distance object.

In order that the components of movements toward the radio device or gun may be anticipated, the reflected signals, which include a frequency dependent upon the rate of movement of the object, are applied to the limiting and discriminating amplifier 105. The output of this amplifier, in the absence of movement of the object, will be zero. If the object is moving slowly toward the radio device, a low frequency component will appear in the receiver output due to the Doppler effect. The frequency of the component will depend upon the rate of approach of the object. Since this component is applied to the limiting and discriminating amplifier 105, it follows that the output currents of the amplifier will be proportional to the frequency of the component, and hence to the velocity of approach. Furthermore, since the output currents are applied to the horizontal sweep circuit, it follows that the sweep may be advanced by an amount proportional to the velocity approach of the object. Therefore, if the currents from the target electrode 107 are applied to control gun fire, the gun will be fired just before the object has reached the predetermined range.

It should be understood that the hereindescribed method is not limited to the specific apparatus illustrated. For example, the signal component corresponding to the Doppler effect may be derived by means of the apparatus illustrated and described in applicant's copending application Serial No. 274,641, filed May 19, 1939, now Patent No. 2,423,644 granted July 8, 1947, for improvements in range finding.

I claim as my invention:

1. A radio echo device including in combination means for radiating four diverging juxtaposed beams each including distinctive pulses of radio frequency energy, means for receiving selectively said pulses after reflection from a distant object, means for deriving from said received pulses components corresponding to said distinctive pulses in each of said beams, means for orienting said radiated beams as a group in azimuth and elevation, means for applying said derived components to said orienting means so that said orienting means will be controlled by said derived components whereby said group of beams will automatically follow said distant object, means for radiating a fifth beam along an axis centrally located with respect to said four beams, and means for indicating the distance of said object as a function of the propagation time of the pulses of said fifth beam to and from said distant object.

2. A radio echo device including, in combination, means for radiating a beam including distance determining radio pulses, means for indicating the distance of a pulse reflecting object as a function of the propagation time of said pulses after their reflection, means for radiating a plurality of beams adjacent to said distance determining beam, each of said plurality of beams including distinctive signals, means for selecting said distinctive signals from said plurality of beams after reflection from said object, means for orienting simultaneously said plurality of beams, and means for controlling automatically said orienting means as functions of said selective signals so that said orienting means automatically directs said plurality of beams toward said object.

3. A device according to claim 1 including means responsive to movements of said orienting means for deriving forces corresponding to the angular velocity of said object, and means for applying said forces to said orienting means so that movements of said orienting means anticipate movements of said object.

4. A radio echo device including in combination means for radiating four diverging juxtaposed beams each including distinctive pulses of radio frequency energy, means for receiving selectively said pulses after reflection from a distance object, means for deriving from said received pulses components corresponding to said distinctive pulses in each of said beams, means for orienting said radiated beams as a group in azimuth and elevation, and means for applying said derived components to said orienting means so that said orienting means will be controlled by said derived components whereby said group of beams will automatically follow said distant object, means responsive to movements of said orienting means for deriving forces corresponding to the azimuthal and elevational angular velocities of said object, and means for applying said forces to said orienting means so that movements of said orienting means cause said group of beams to anticipate movements of said object transverse to said beams.

5. A device according to claim 3 including means for radiating a fifth beam of radio pulses along the center line of said four beams, means for indicating the distance of said object as a function of the propagation time of the pulses of said fifth beam, means for deriving from the reflected pulses of said fifth beam forces proportional to the velocity of movement of said object along said center line, and means for applying said derived forces to said indicating means to anticipate movement of said object along said center line.

6. A radio echo device including in combination means for radiating a beam including distance determining radio pulses, means for indicating the distance of a pulse reflecting object as a function of the propagation time of said pulses after their reflection, means for radiating a plurality of beams adjacent to said distance determining beam, each of said plurality of beams including distinctive signals, means for selecting said distinctive signals from said plurality of beams after reflection from said object, means for orienting simultaneously said plurality of beams, means for controlling automatically said orienting means as functions of said selective signals so that said orienting means automatically directs said plurality of beams toward said object, means for deriving forces from said distance determining pulses corresponding to the velocity of movement of said object along said beam including distance determining radio pulses, and means for applying said derived forces to said distance indicating means to anticipate said movements along said beam including distance determining radio pulses.

7. A radio echo device including in combination means for radiating a beam including distance determining radio pulses, means for indicating the distance of a pulse reflecting object as a function of the propagation time of said pulses after their reflection, means for radiating a plurality of beams adjacent to said distance determining beam, each of said plurality of beams including distinctive signals, means for selecting said distinctive signals from said plurality of beams after reflection from said object, means for orienting simultaneously said plurality of beams, and means for controlling automatically said orienting means as functions of said selective signals so that said orienting means automatically directs said plurality of beams toward said object, means responsive to movements of said orienting means for deriving forces corresponding to the angular velocity of said object, means for applying said forces to said orienting means so that movements of said orienting means anticipate movements of said object, means for deriving forces from said distance determining pulses corresponding to the velocity of movement of said object along said beam including distance determining radio pulses, and means for applying said derived forces to said distance indicating means to anticipate said movements along said beam including distance determining radio pulses.

8. A device according to claim 6 including means for controlling an electrical circuit upon reception of reflected signals from an object at a predetermined range.

9. A device according to claim 6 including means for controlling an electrical circuit upon reception of reflected signals from an object approaching a predetermined range.

10. A radio echo device including in combination means for radiating four diverging juxtaposed beams each including distinctive pulses of radio frequency energy, means for receiving said pulses after reflection from a distant object, means for deriving from said received pulses components corresponding to said distinctive pulses in each of said beams, means for orienting said radiated beams as a group, and means for applying said derived components to said orienting means so that said orienting means will be controlled by said derived components, whereby said group of beams will automatically follow said distant object, said device further including means for radiating a fifth beam of radio pulses along the center line of said four beams, and means for indicating the distance of said object as a function of the propagation time of the pulses of said fifth beam to and from said distant object.

11. A radio echo device including in combination means for radiating separately directed juxtaposed beams each including pulses of radio frequency energy, means for receiving said pulses after reflection from a distant object, means for deriving from said received pulses components corresponding to the reflected pulses in each of said beams, means for orienting said radiated beams, and means for applying said derived components to said orienting means so that said orienting means will be controlled by said derived components, whereby said directed beams will automatically follow said distant object, said device further including means for radiating an additional beam of radio pulses along the center line of said juxtaposed beams, and means for indicating the distance of said object as a function of the propagation time of the pulses of said additional beam to and from said distant object.

JOHN EVANS.

REFERENCES CITED

The following references are of record in the file of this patent:

UNITED STATES PATENTS

| Number | Name | Date |
|---|---|---|
| 1,467,154 | Hammond | Sept. 4, 1923 |
| 2,176,469 | Moueix | Oct. 17, 1939 |
| 2,189,549 | Hershberger | Feb. 6, 1940 |
| 2,193,361 | Rice | Mar. 12, 1940 |
| 2,207,267 | Plaistowe | July 9, 1940 |
| 2,409,448 | Rost et al. | Oct. 15, 1946 |

FOREIGN PATENTS

| Number | Country | Date |
|---|---|---|
| 455,765 | Great Britain | Oct. 27, 1936 |